Aug. 17, 1937.  D. M. HUNTER  2,090,257
FRUIT WRAPPING MACHINE
Filed Aug. 28, 1934  7 Sheets-Sheet 1
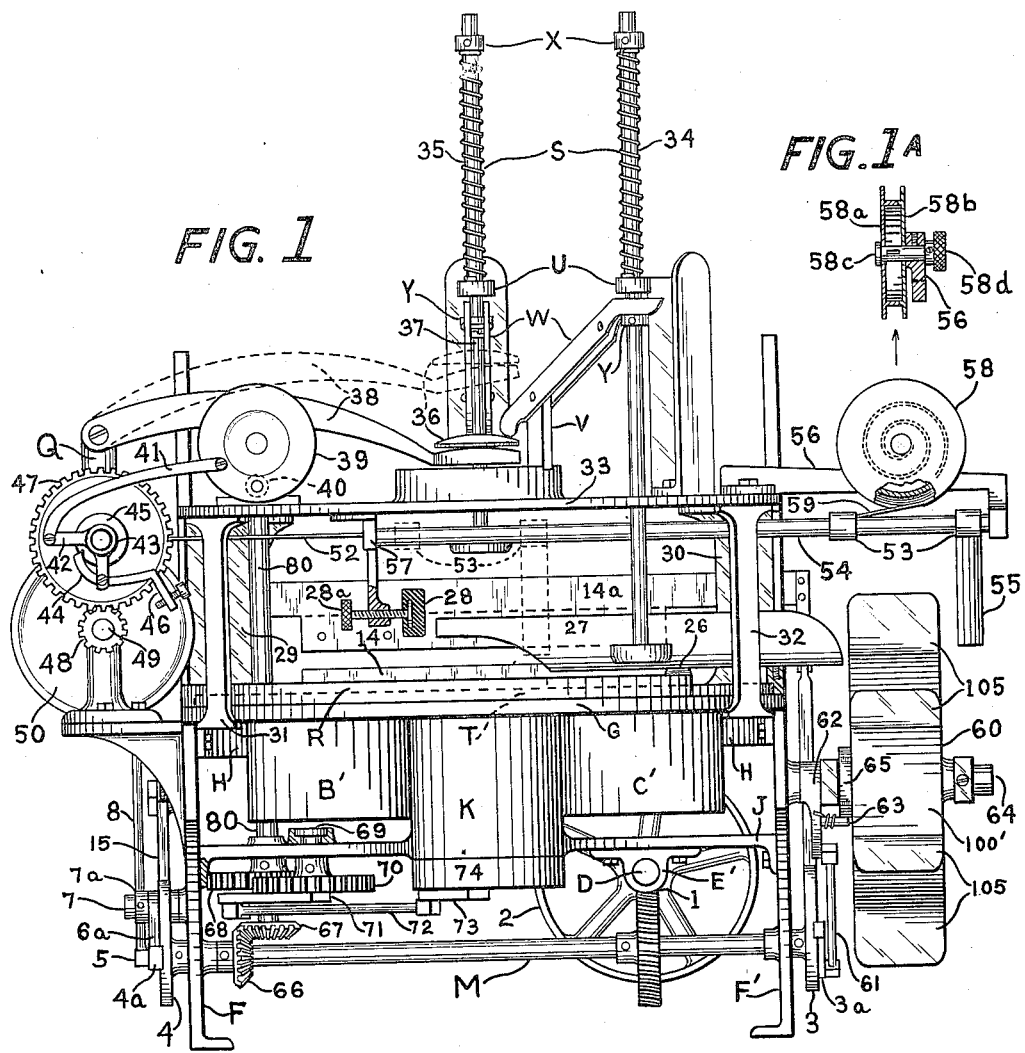
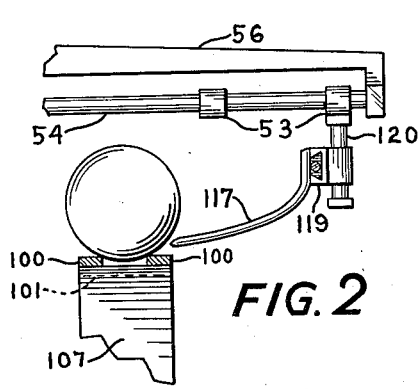
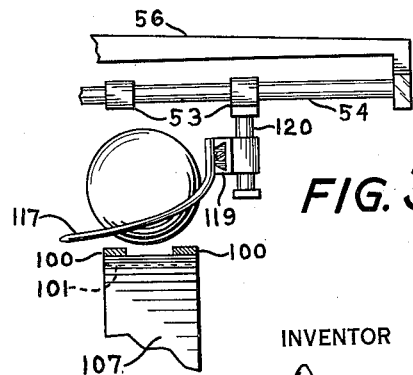
INVENTOR
Don M. Hunter

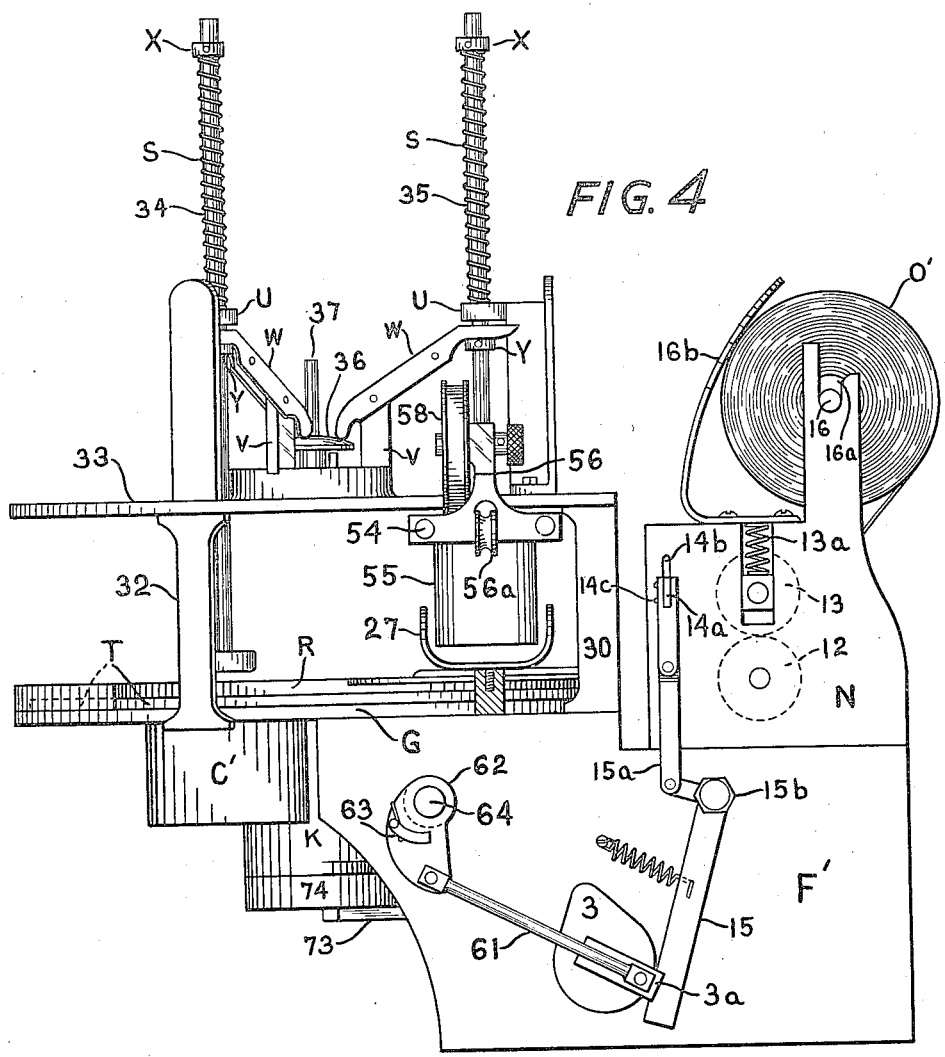
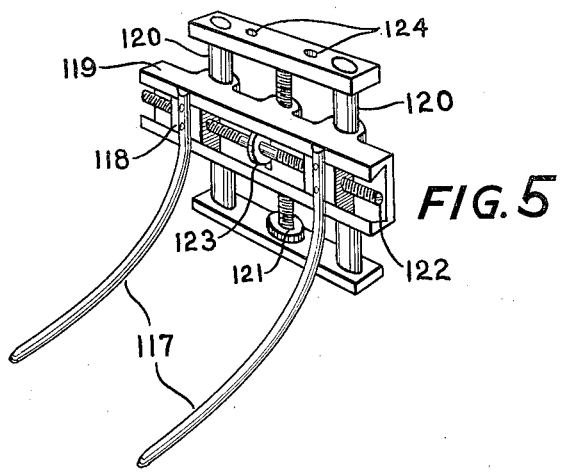

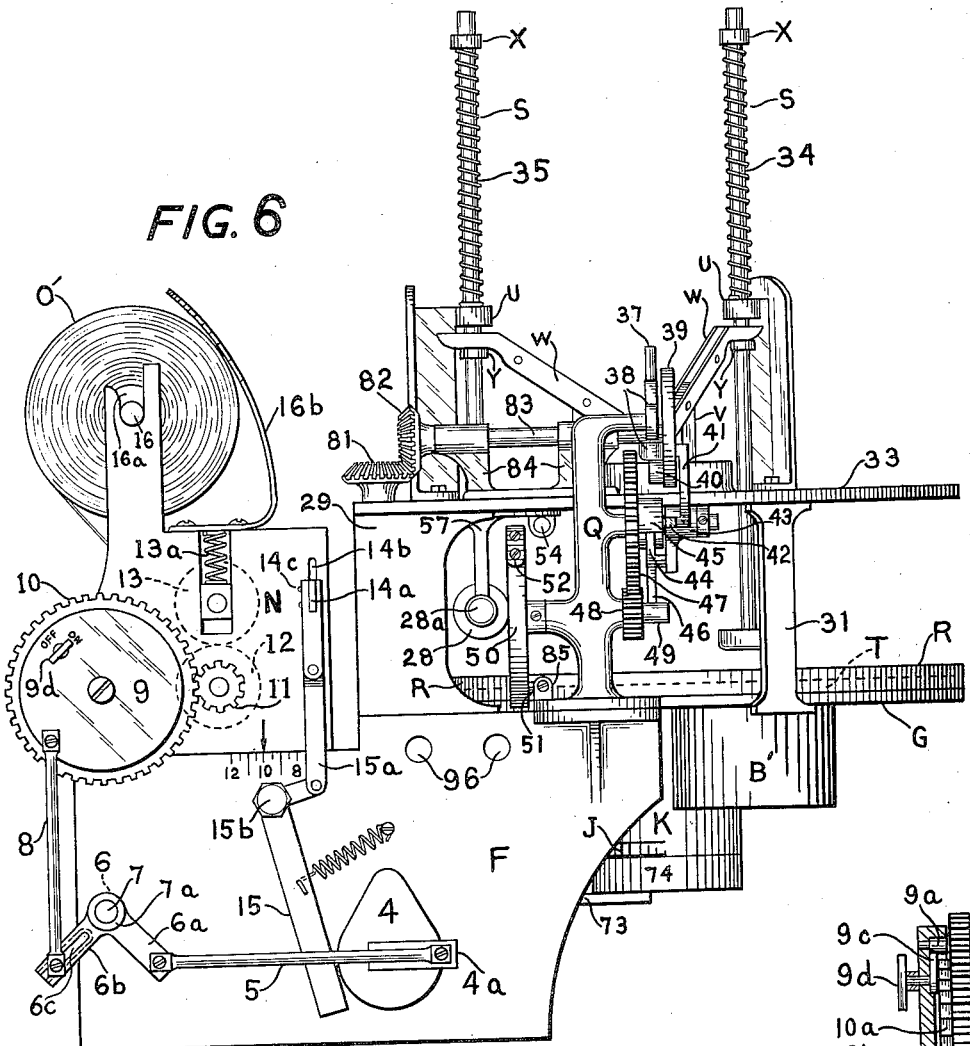

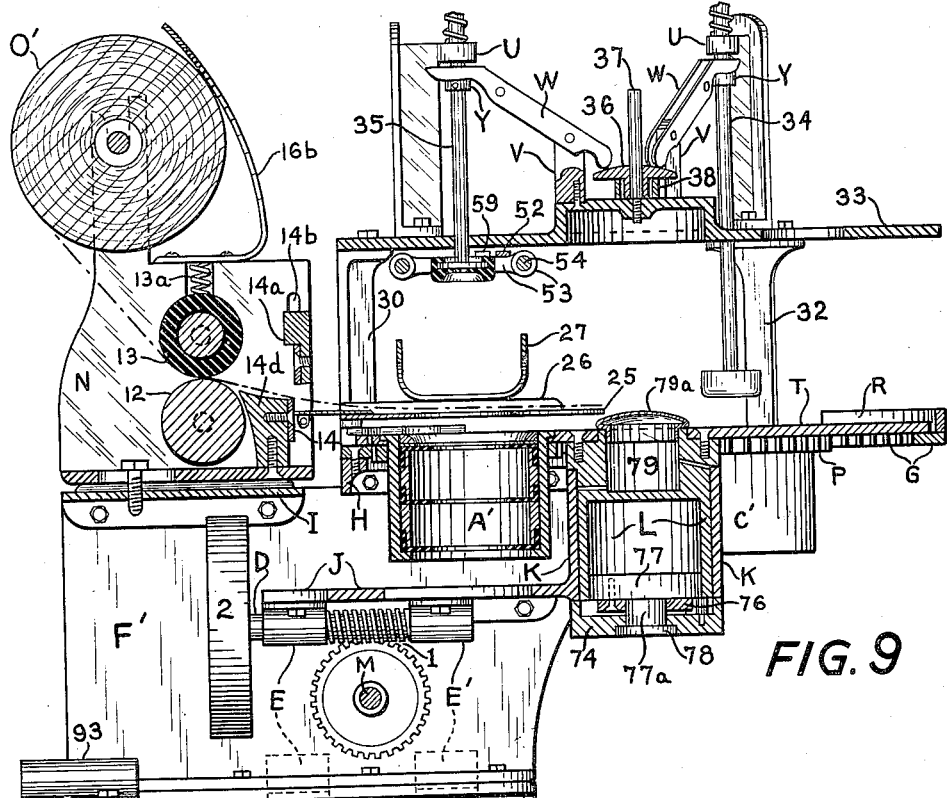
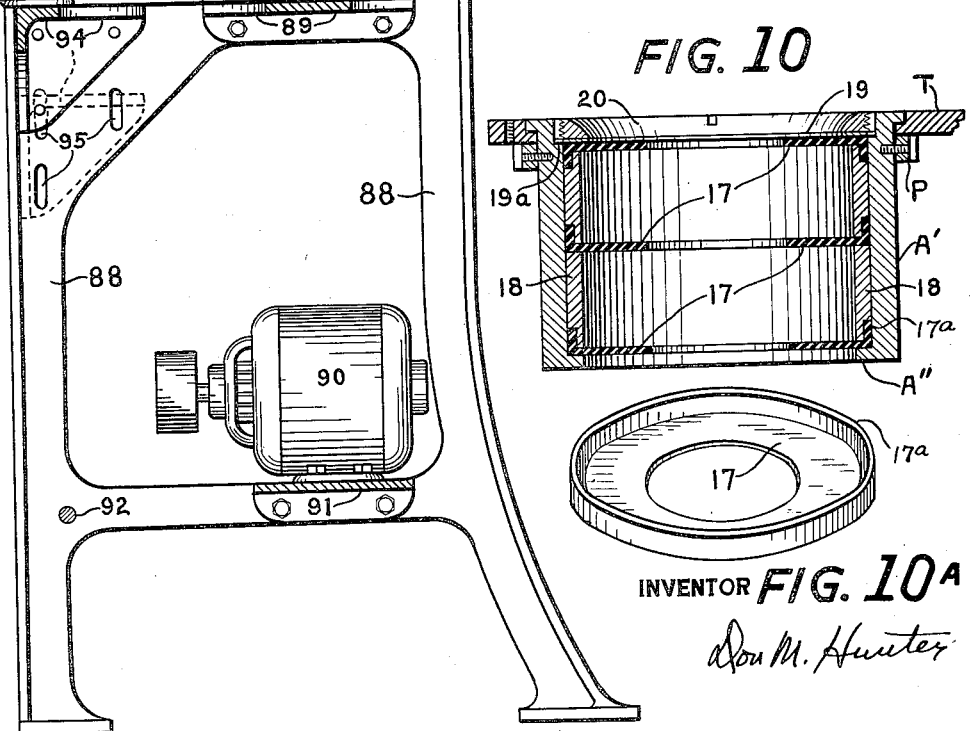

Aug. 17, 1937.  D. M. HUNTER  2,090,257
FRUIT WRAPPING MACHINE
Filed Aug. 28, 1934  7 Sheets-Sheet 5
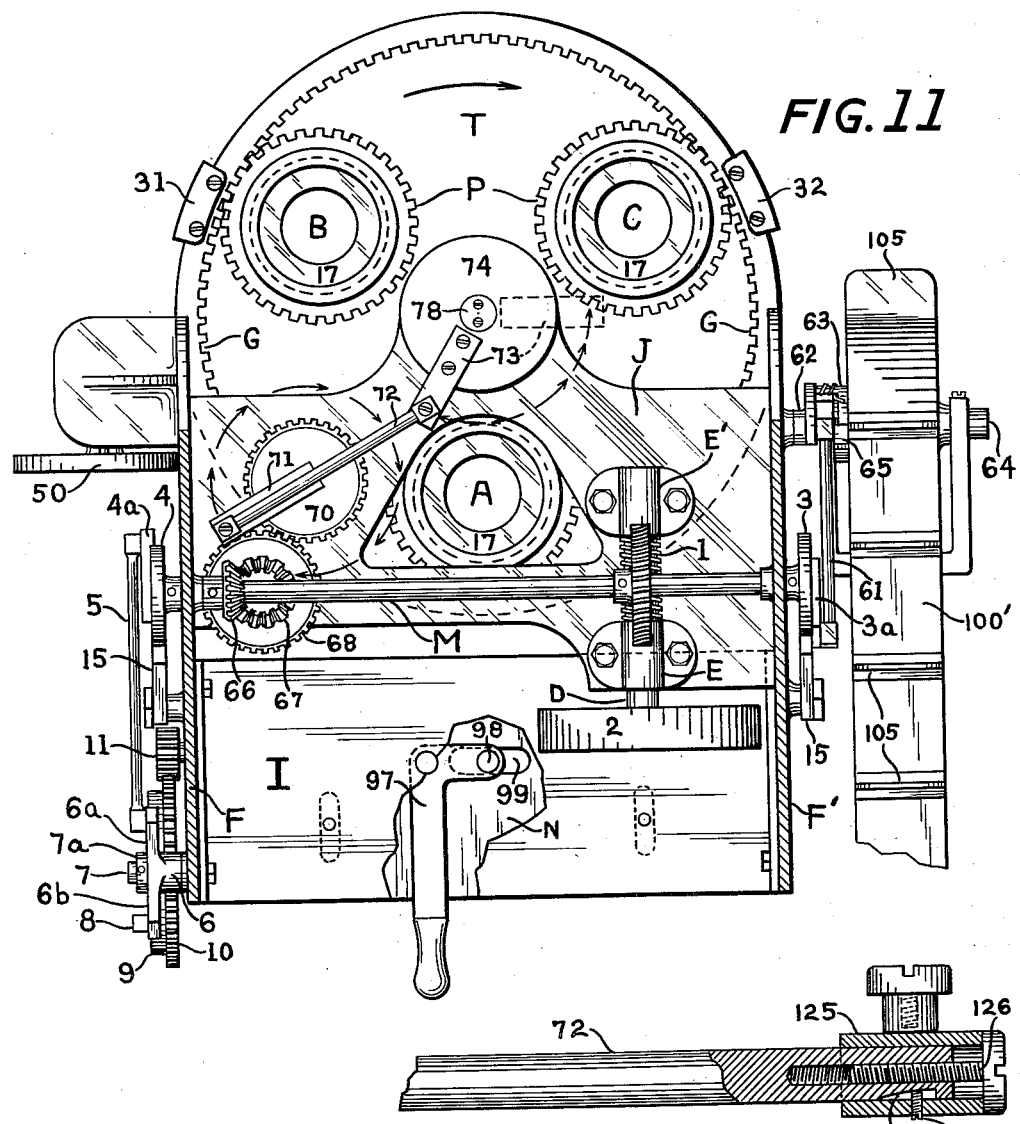
FIG. 11
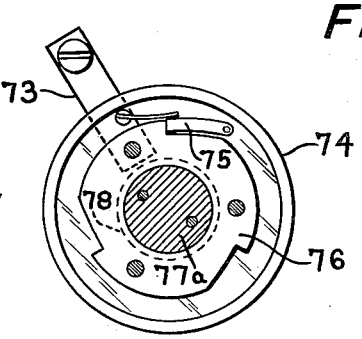
FIG. 12
FIG. 13
INVENTOR
Don M. Hunter

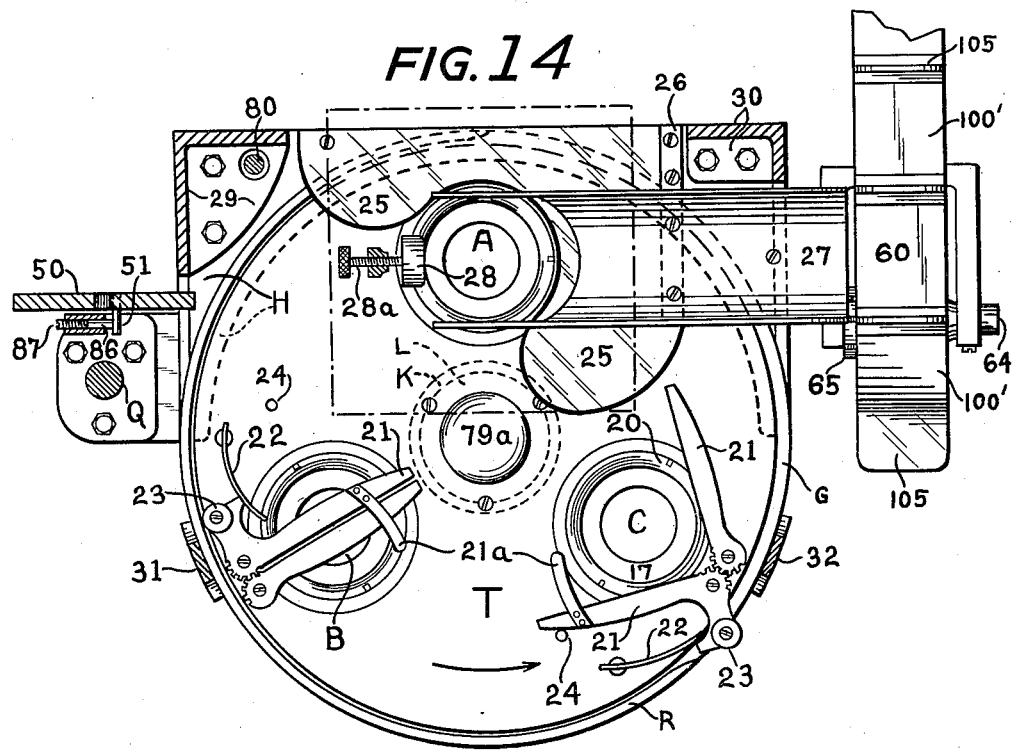
FIG. 14
FIG. 15
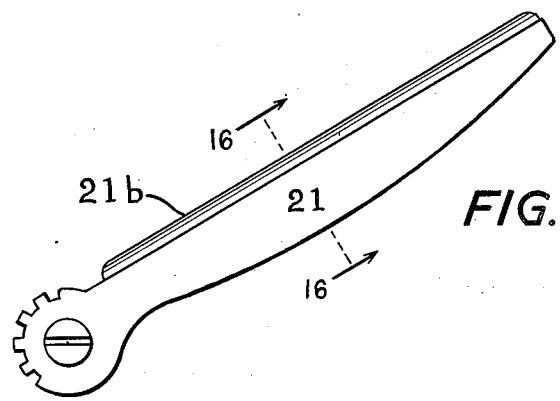
FIG. 16
INVENTOR
Don M. Hunter

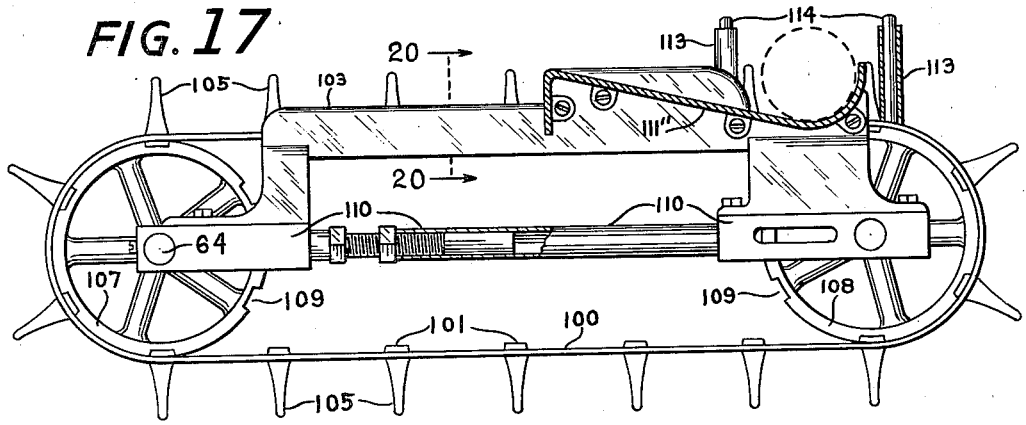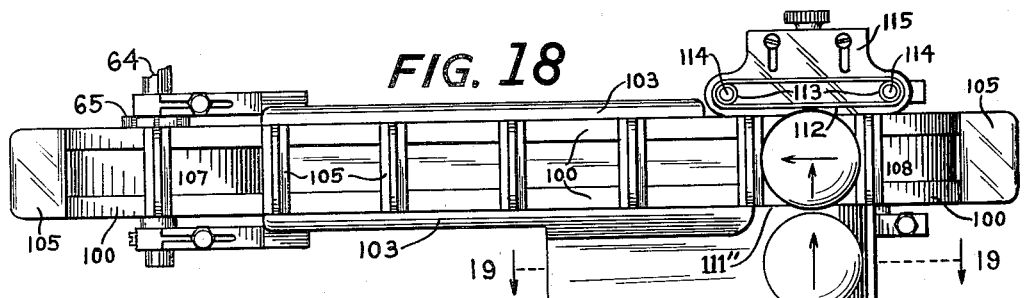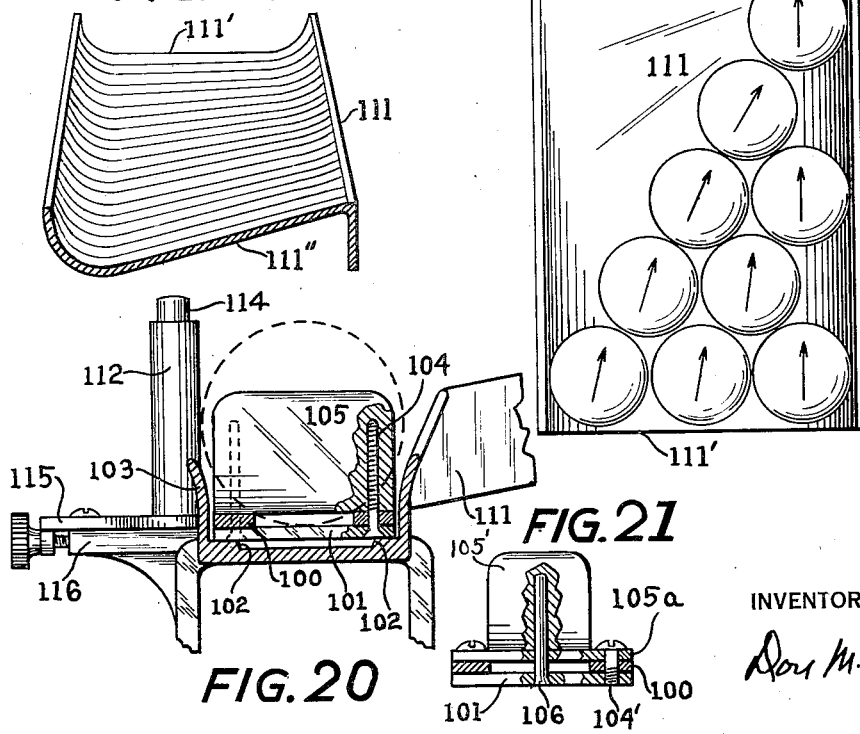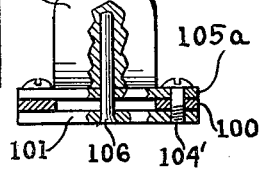

Patented Aug. 17, 1937

2,090,257

UNITED STATES PATENT OFFICE 2,090,257

FRUIT WRAPPING MACHINE

Donald M. Hunter, Wawawai, Wash.

Application August 28, 1934, Serial No. 741,769

30 Claims. (Cl. 93—5)

The present invention relates to an improved fruit wrapping machine and involves the mechanical principles necessary to correctly time a series of intermittent movements of the parts, for chronologically conveying, the fruit from a hopper, or grader to required position upon the wrapper and thereupon wrapping, twisting and ejecting the wrapped fruit.

In carrying out my invention I provide means for conveying the fruit singly, in individual pockets, to a position where it is received by a lateral carrier, which in turn individually moves the fruit to required position upon a wrapper, automatically sized and cut from a continuous roll; means are provided for enveloping the fruit in said wrapper and securing the same by twisting, whereupon the fruit is ejected from the machine.

The wrapping means, is of the rotary type and is continuous in operation, there being unwrapped fruit, fruit being wrapped and wrapped fruit in the machine simultaneously.

Means are provided to momentarily interrupt the rotary movement, for simultaneous introduction of the unwrapped fruit and ejection of the wrapped fruit; thereby assuring that the fruit will not be damaged by being caught between moving parts.

Means are provided to accommodate fruits of various sizes and the device is adaptable to wrap apples, oranges, or other fruits, or objects of similar shape.

Means are provided to adjust the sizing of the automatically cut wrappers; whereby appropriate size wrappers are provided for each size of fruit.

The device is entirely automatic and operates entirely without the aid of human hands. Practically no attention is required other than to provide the required fruit to be wrapped.

By the utilization and employment of the device of my invention, the fruit is properly and uniformly wrapped at a greater rate of speed than is otherwise possible; thereby resulting in a substantial saving of time and the consequent more rapid harvesting of the crop.

The invention consists of certain novel structures, combinations and arrangements of parts as will hereinafter be more fully set forth and claimed. It will be understood that the invention is not restricted to the exact structures herein illustrated and described, but that modifications may be made in the disclosed structures without departing from the principles of the invention and the intent of the claims. The accompanying drawings illustrate the physical embodiment of my invention.

Figure 1 is a front elevation of the invention.
Figure 1A is a sectional view of the reel.
Figure 2 illustrates the primary position of my improved basket for the lateral carriage.
Figure 3 shows the elements of Figure 2, in actuated position.
Figure 4 is a right side elevation of Figure 1, the conveyor being removed to disclose other essential parts.
Figure 5 is an enlarged perspective view of my improved basket for the lateral carriage.
Figure 6 is a left side elevation of Figure 1.
Figure 7 is an enlarged detail, partly in section of the preferred form of wrapper sizing mechanism.
Figure 8 is a vertical section of Figure 7.
Figure 9 is a vertical section, showing the machine supported on legs, the push rods being broken away.
Figure 10 is an enlarged sectional detail of one of the rotatable retaining pockets.
Figure 10A is a perspective view of the preferred embodiment of an elastic diaphragm.
Figure 11 is an underneath plan view of the invention, disclosing the power transmission and means for intermittently revolving the turn plate.
Figure 12 is an enlarged detail view partly in section, disclosing means for critical adjustment.
Figure 13 is an enlarged detail view, partly in section, and discloses the means for intermittently revolving the turnplate.
Figure 14 is a plan view, of the turnplate and co-related parts.
Figure 15 is a greatly enlarged view of a wrapper gripping tong.
Figure 16 is a sectional view of Figure 15.
Figure 17 is a side elevation of my improved conveyor, the feed trough being broken away.
Figure 18 is a top plan view of Figure 17, disclosing the feed trough.
Figure 19 is a transverse section of the feed trough, taken on the line 19—19 of Figure 18.
Figure 20 is a transverse section of the conveyor, taken on the line 20—20 of Figure 17.
Figure 21 shows a modified dividing fin attached to paired belts.

The wrapping of fruit permits of a tight pack, which materially lessens the injury attendant distribution and consequently minimizes the deterioration otherwise due to such cause. The spread of decay from one fruit to another is quite effectively prevented by wrapping. The wrappers may be chemically treated to prevent bacterial propagation and thereby materially lessen the hazard of storage. Wrappers permit of labelling each fruit, which is a publicity having great influence upon distribution.

Heretofore, fruit has generally been wrapped by hand. The present invention provides means for expeditiously wrapping the fruit by mechanical means, whereby it is not touched by hands after being chemically washed and mechanically sized, thereby assuring maximum sanitation and uniformity of the wrapping, not otherwise obtainable by hand wrapping.

In carrying out my invention, I provide a small, compact unit, which will perform its required functions properly.

The mechanism is housed in a frame adapted to be supported on legs or other suitable support. Preferably, the frame proper, comprises the two end plates F, F', rigidly secured together by the cross members H, I, and J (Fig. 9). The main shaft M is journaled in the end plates F, F' and is turned by the shaft D, preferably, by means of worm reduction as indicated at 1. The shaft D is suitably journaled at E and E' and may be provided with a pulley 2, or other suitable means, by which the device may be driven from any available power source.

Supported on top of the frame plates F, F' is an internal gear G, surmounted by a fractionally circumferential rib or rim R, these parts are further supported by the cross member H which is semicircular in shape, to which they may be bolted from the underneath side. The cross member J carries a casing K concentric with said internal gear and circumferential rib. Rotatable within said casing K is a column L, to which is rigidly secured, a turnplate T. As best seen in Figure 14, the turnplate T is provided with a number of equally spaced pockets; in the present instance three in number, indicated as A, B and C and the operation of the machine will be described with relation to this arrangement. Obviously, any number of pockets might be employed, but no object is seen for departing from the number indicated.

Each pocket comprises a cylindrical portion A', B', C', rotatably mounted in the turnplate T, and as best seen in the underneath plan view of Figure 11, each pocket is provided with a gear P, rigid therewith. All of these gears P, P, P engage with the internal gear G and form a planetary system therewith, whereby the revolving of said turnplate rotates said pockets in a planetary manner.

As best seen in Figure 10, each pocket is provided with a number of yieldable members 17, spaced at some distance apart. Preferably, the yieldable members 17 are perforate elastic rubber diaphragms, and may be secured in position by any suitable means. As shown in Figure 10A, these yieldable members are preferably of cap-like shape and adapted to fit over the outside of an externally stepped ring 18. The annular peripheral skirt 17a is integral with the perforate elastic diaphragm 17 and forms the rim of the cap-like member. This rim fits upon the reduced portion of the externally stepped ring 18 as shown in Figure 10. These diaphragms, upon their rings are snugly fitted into the cylindrical pocket. Each pocket is provided with an internal shoulder or flange A", the bottom diaphragm, upon its ring, seats against this shoulder, and its ring provides a seat for the diaphragm above. By using different widths of the rings 18, the number of diaphragms in each pocket may be varied. By necessity the top ring carries two diaphragms, one above and one below. The friction washer 19 is superimposed upon the top diaphragm and preferably locked against turning by one or more tongues 19a engaging in a complementary groove in the wall of the pocket, which latter member is threaded to receive the retaining ring 20 which is notched for a spanner, whereby the assembled parts may be secured, in fixed relation, free from accidental dislodgement. This improved assembly provides for quick replacement of a single diaphragm, when required for any reason. The retaining ring 20 is preferably rounded inwardly and downwardly to aid in positioning the fruit relative to the diaphragm.

As shown in Figure 14, superimposed above each pocket, is a pair of coacting tongs 21, 21, which are held in open position by means of the spring 22, and are closed by means of the friction roller 23 contacting the circumferential rib or rim R. The circumferential rim R is fractional and appropriately positioned, whereby the tongs are in closed position while any pocket occupies a position between A and C, and whereby the tongs are in open position while any pocket occupies a position between C and A. Preferably, the opening of the tongs is limited by an appropriately positioned rawhide bump post 24. An arm 21a may be secured to one of the tongs to assure proper positioning of the wrapper between the tongs.

Preferably, the adjacent edges of the paired tongs 21 are provided with a longitudinal channel into which is frictionally engaged a filler 21b as shown in Figures 15 and 16. Preferably, the filler 21b is of elastic rubber and provided with a beaded edge, as shown. This embodiment provides a slightly yieldable grip, which of course is highly desirable.

As seen in Figure 14, an apron 25 is positioned where the wrapper is fed into position. This apron is spaced above the turnplate T, sufficiently to clear the tongs 21 and roller 23. Preferably, each of the rear corners of the apron, is secured by flush screws to an appropriately located boss on the cross member H. A bolster 26 is secured to the right side boss by flush screws and this bolster overlays the apron 25. The bolster 26 also supports the trough 27 which latter structure serves to keep the fruit within bounds while being positioned relative to the pocket and also assures that the moving fruit will not displace the positioned wrapper indicated by the dot and dash line. The trough 27 may be secured to the bolster 26 by flush screws or rivets which also secure the apron 25 to the underside of the bolster, whereby the bolster serves as a support for the forward extension of the apron 25, which is appropriately shaped to provide adequate support for the wrapper positioned thereon and thereby preclude entanglement of the wrapper with the parts of the revolving turnplate and at the same time provide for freedom of movement of that portion of the wrapper protruding above the aforementioned tongs, as the turnplate revolves in the required manner.

As shown in Figure 14, the apron 25 is notched out on the edge forward to the path of travel of the pockets A, B and C. That is to say, it is cut away sufficiently to assure easy entrance of the fruit and wrapper into the pocket at the position A and to provide an open path for the protruding portion of the wrapper. Preferably, the edge forward to the path of travel is formed with reverse curves comprising a concave curve concentric with the pocket at the position A and flanked on either side by a convex curve continuous therewith. The concave curve should be at least a semicircle and approximate the diameter of the pocket; the convex curves may be arcuate or otherwise.

As seen in Figure 1, a buffer 28 is spaced sufficiently above the turnplate to provide for passage of the wrapper protruding from between the aforementioned tongs as the turnplate revolves as required. The buffer 28 is preferably of spongy rubber, and attached to an adjusting screw 28a threaded into a pendant part of the bracket 57, whereby each size of fruit may be stopped at the required position. The outer end of the trough 27 extends to the conveyor 60, to provide a passage for the lateral movement of the fruit. The trough 27 may be further secured by a flush screw threaded into an appropriate boss on the cross member H.

The brackets 29 and 30 are secured to the cross member H and are preferably bolted from the underside for convenience in assembling. The top plate 33 is supported upon these brackets to which it may be bolted from above, forwardly is supported by the brackets 31 and 32 which are bolted to the underside of the gear G and to the top plate 33.

The top plate 33 carries a pair of vertical push rods 34 and 35, each axially disposed relative to the positions of the pockets C and A respectively. Each of these push rods passes through the top plate 33 and are slidable in their respective supports U, U. Each push rod is provided with a spring S, the tension of which may be adjusted by means of the collar X, and the lower end of each rod carries a suitable buffer, preferably of spongy rubber.

The push rods 34 and 35 are simultaneously actuated by the levers W, W, fulcrumed on the posts V, V. The levers W, W, are preferably forked and straddle the push rods, engaging with a collar Y by means of which the range of thrust may be adjusted as required.

Each of the levers W, W, impinge against a dome-top collar 36, slidable upon a vertical spindle 37 rigid with an elevated portion of the top plate 33. As best seen in Figure 1, the collar 36 is lifted by the lever 38 which is fulcrumed on the support Q. Preferably, the lever 38 is forked and straddles the collar 36 below the dome-top. The lever 38 is actuated by a roller 40 (Figures 1 and 6) secured to the rear face of the wheel 39.

To the wheel 39 is pivoted a bar 41, the opposite end of which is pivoted to an arm 42 on a collar 43 carrying a ratchet pawl 44 which engages a single-notch ratchet wheel 45, rigid with a gear 47, meshing with a pinion 48, rigid with a shaft 49, with which turns the winding drum 50 also rigid with the shaft 49, which latter member serves as a trip for disengagement of the ratchet pawl 44 which is held in contact with the ratchet wheel 45 by gravity of the pendant arm 46 and tripped when the latter impinges the shaft 49, the critical moment of release being adjusted by the illustrated set-screw. It should be mentioned that the pendant arm 46 is used for convenience of illustration and that in actual practice a more compact means is employed.

Secured to the winding drum 50 is a flat cable 52, preferably of flexible metal or fabric. The opposite end of this cable is secured to a lateral carriage 53, provided with a basket 55. It will be readily understood that the action of the parts described in the preceding paragraph, will wind the cable 52 upon the drum 50, thereby imparting the required movement to the carriage 53.

The carriage 53 comprises suitable journal members connected by a web as is shown in Figure 9, an appropriate basket being connected thereto. The carriage 53 is slidable upon the paired rods 54, which are of appropriate length to accommodate the required movement of the carriage. The rods 54 are rigidly supported by the overhead bracket arm 56, and by the bracket 57 secured to the underneath of the top plate. Attached to the overhead arm 56 is a winding reel 58 upon which is wound a suitable length of flat cable 59, the free end of which is secured to the lateral carriage 53, and it will of course be plain that this winding reel will return the carriage to normal position when the opposite force is released in the previously described manner.

As shown in the sectional view of Figure 1A, the winding reel 58, preferably comprises a drum portion 58a and a back plate 58b, these parts being held in relative engagement by lugs on either member engaging in slots in the other member, both of said members are bored for the shaft 58c upon which they turn. The outer end of the shaft 58c, is flanged and an appropriate slot is provided for the inner end of the required spring. It will be readily understood that the outer end of the required spring may with facility be secured to the drum portion 58a and its inner end to the shaft 58c, after which the back plate 58b is positioned and the shaft secured in its bore in the bracket arm 56. The shaft protrudes sufficiently to permit attachment of the illustrated hand wheel 58d, by means of which the tension of the aforementioned spring may be regulated, and the shaft 58c then held against turning by any suitable means, as for instance by the illustrated set-screw. This simplified construction facilitates assembly or disassembly when required for any reason.

For emergency use, a grooved pulley 56a may be provided. When required for emergency, any convenient cable may be secured to the lateral carriage 53 and said cable may be trained over the emergency pulley 56a and the end of said cable weighted in any convenient manner, to temporarily serve the purpose of the reel 58.

On opposite ends of the main shaft M are cams 3 and 4 which of course turn with the shaft. As seen in Figure 6, to the cam 4 is secured an arm 4a, to which is pivoted the connecting bar 5, the opposite end of this bar is pivoted to the rocker arm 6a on the collar 6 which turns fractionally on the dead spindle 7 secured in the frame F, the collar 6 being retained upon this spindle by a suitable collar 7a. The collar 6 carries a second lever arm 6b, one end of the connecting bar 8 is pivoted on the lever arm 6b and the opposite end is pivoted to the drum 9 which carries a ratchet pawl 9a (Figure 7) actuating the ratchet wheel 10a rigid with the gear 10 which engages a pinion 11 rigid with the shaft of the roller 12. The roller 13 is journaled in a floating bearing and is held in contact with the roller 12 by spring tension as indicated at 13a. These rollers are journaled in a separate frame N, slidably mounted on the cross member I. The frame N also carries the gear 10 and the aforementioned ratchet members, and is further provided with a pair of knives 14 and 14a. The knife 14 is rigid with the frame N and the knife 14a is movable. As best seen in Figures 4 and 6, both ends of the knife bar 14a are slidable in the guide 14b fashioned on the movable frame N.

The knife bar 14a is connected to the paired levers 15, 15 (Figures 4 and 6) by means of the links 15a, 15a. The levers 15, 15 are in the nature of bell cranks and are each fulcrumed as indicated at 15b and are pendant therefrom, their lower ends engaging with the aforementioned cams 3 and 4, by which they are actuated once upon each revolution of the main shaft M. As seen in Figures 4 and 6, said cams engage said levers after the radius arm 4a has completed its full stroke, and from this description, it will be seen that the rollers 12 and 13 complete their excursion, remain stationary, after which the knife 14a is actuated. As shown in these figures, the cam 4 is set slightly in advance of the cam 3 to afford the proper shear action, and of course the necessary freedom is provided in the pins 14c.

The wrappers are provided in a roll O' supported on a spindle 16 detachably mounted in the open slots 16a provided in a vertical extension of the frame N, and a suitable spring 16b prevents excess rotation of the wrapper roll O'. From this roll, the wrappers are fed between the rollers 12 and 13 and passed between the aforementioned knives, as indicated by the dot and dash line in Figure 9, where it will be seen that the knife bar 14d forms an apron adequately supporting the wrapper in required position.

The sizing of the wrappers may be accomplished by making any one of the pivots radially adjustable in their respective arms, 4a, 6a, 6b or in the ratchet drum 9; as for instance, as is indicated at 6c in Fig. 6, whereby the excursion of the rollers 12 and 13 may be controlled as required. Preferably I employ an improved means which facilitates the required adjustment. As shown in Figure 7, a disc 9e is pivoted on the drum 9, and the connecting bar 8 is pivoted eccentrically of the disc 9e, whereby rotation of the disc 9e will alter the radial distance between the axis of the drum 9 and the pivot of the bar 8, which will of course affect the rotation of the ratchet drum 9, the thrust of the bar 8 being constant. The disc 9e may be held in any required position of rotation by any suitable means, as for instance by means of the post 9f engaging one of a series of spaced notches on the periphery of the disc 9e. The disc 9e may be recessed into an appropriate boss 9h, in which case the boss is of course bored to admit the post 9f, which latter member is preferably threaded into the drum 9. Three appropriately positioned posts as 9f may be utilized and the disc 9e rotated in its boss, pivoting of said disc being omitted. The present means is used for the convenience of illustration, and for greater facility, I employ a spring pressed detent pin, appropriately located in the pivoted disc 9e and alternately engageable in complementary holes, spaced in a semicircular arrangement in the drum 9 and concentric with the pivoted disc 9e. A suitable scale designating the size of the wrappers is illustrated in Figure 7, an appropriate mark on the disc 9e indicating the adjusted size. It should be mentioned that the decentration of the pivot for the bar 8 is exaggerated for the convenience of illustration, and that relatively less eccentric position is required.

To accommodate instances where the supply of fruit is momentarily interrupted, it is advantageous to interrupt the delivery of wrappers without stopping the machine. This may be accomplished by a suitable detent engaging the ratchet pawl 9a, whereby the latter member may be held free of the ratchet wheel 10a. Preferably, I employ a small cam 9c, pivoted in the drum 9 and externally thereof provided with a hand wheel or thumb-key 9d, the operation of which will appear obvious, the action being illustrated in Figure 8. In this figure it will be seen that the gear 10 and the drum 9 are journaled on a dead spindle rigid with the frame plate N, and bearing surface is enhanced by means of an internal hub on the drum 9. Other means may be employed for interrupting the delivery of the wrappers, as for instance the pinion 11 may be feathered on its shaft and the former provided with an appropriate hand wheel, preferably free upon a collar rigid with said pinion, whereby said pinion may with facility be disengaged or reengaged with the gear 10; or, the pinion 11 may be free upon its shaft and held in position by a collar rigid with said shaft, said collar having a secondary transverse bore through which passes a detent pin, which latter member engages in a complementary transverse bore in the pinion 11. The detent pin may be moved by any suitable means, as for instance by a slidable collar, preferably provided with a handwheel, free thereupon, and obviously said retaining collar being rigid with its shaft, the pinion 11 will turn said shaft when engaged with said rigid collar by means of the described detent pin and disengagement will permit the pinion 11 to turn free upon its shaft unaccompanied by rotation of the rollers 12 and 13. Either of such provisions will preclude the necessity of stopping the machine to preclude the delivery of wrappers in the absence of fruit which is of course objectionable.

The sizing of the wrappers is supplemented by appropriate width of the wrapper roll O'. The frame N carrying the wrapper roll and the previously described sizing mechanism is slidably adjustable relative to the frame proper, whereby each size of wrapper may be properly positioned relative to the pocket at position A. The slidable adjustment of the frame N may be accomplished in any practical manner, as for instance by means of bolts, each slidable in a slot in the base of the frame N and threaded into the cross member I as shown in Figure 9. Preferably, the cross member I and the base of the frame N are spaced by appropriate bosses each having a suitable keyway to assure constant alignment. As seen in Figure 11, the lever 97, which is in the nature of a bell crank, is fulcrumed on a pivot in the cross member I and provided with a stud 98 engaging in a slot 99 in the base of the frame N, whereby the lever 97 may be employed to slidably adjust the frame N as required, a suitable scale and indicator being provided on the exterior as illustrated in Figure 6; and for practical purposes, this scale is preferably, separate and applied in any convenient manner.

As seen in Figure 4, the cam 3 carries an arm 3a to which is pivoted a connecting bar 61, the opposite end of which is pivoted to a collar 62, carrying a ratchet pawl 63 provided with a suitable spring. The collar 62 turns fractionally on the spindle 64 which is rigid with the frame F'. As seen in Figure 1, the ratchet pawl 63 engages a ratchet wheel 65 rigid with the pulley 107 of the conveyor which is collectively referred to as 60. The conveyor comprises an endless belt having a number of equally spaced pockets of suitable size and the ratchet wheel 65 is adapted to move the conveyor exactly one pocket at each revolution of the main shaft M to which the cam 3 is secured.

The means for periodically rotating the turnplate T, a fractional amount equal to the spacing of the pockets thereon, is best seen in the underneath plan view of Figure 11. The miter gears 66 and 67, and the spur gears 68 and 70, each turn at the same rate as the main shaft M. The gear 70 carries an arm 71 to which is pivoted the connecting bar 72, the opposite end of which is pivoted to the arm 73 carried by the ratchet drum 74, which latter member is shown in detail in Figure 13.

Referring to Figures 9 and 13, the drum 74 carries the ratchet pawl 75, which is of course provided with a suitable spring. The ratchet wheel 76 is secured to the member 77, shown in Figure 9. The member 77 is rigid with the column L which is secured to the turnplate T. The member 77 is stepped down at 77a and the ratchet drum 74 is pivoted on this extension and secured in position by the disc 78, by any suitable means, as for instance by the screws indicated in Figure 11. From this description it will be readily understood that at each revolution of the main shaft M, the turnplate T is fractionally rotated to position each pocket alternately at the location indicated at A, the direction of rotation and range of stroke being indicated by appropriate arrow lines. Exact register at the proper position is accomplished by means of the adjustment feature shown in Figure 12.

As shown in Figure 12, the connecting bar 72 is fitted into the block 125 which is provided with the required pivot for engagement in the arm 73. The bar 72 is axially drilled and threaded for the reception of the adjusting screw 126 and is also provided with a longitudinal notch 127, which notch diminishes in depth away from the threaded end of said bar. The bar 72 being of the proper length as illustrated, it will be readily apparent, that the screw 126 may be employed to accomplish critical adjustment of the relative position of the turnplate T when the parts in question are assembled on the arm 73 in the manner shown in Figure 11. The bar 72 is locked in its relation with the block 125 by means of the set screw 128 as illustrated. This improved means for critical adjustment compensates for the minor inaccuracies which are permissible in the commercial manufacture of the parts, and the minor adjustments occasioned by wear can with facility be accurately accomplished by the described means. Similar means is also employed on the connecting bar 61, shown in Figure 4, thereby providing for critical adjustment of the relative position of the conveyor, which critical adjustment is of course essential to proper operation.

Referring again to Figure 9, it will be seen that the column L which supports the turnplate T, is supported upon the vertical casing K within which it turns and it should be mentioned that slight clearance is provided between the turnplate T and the internal gear G, whereby the only friction is between the column L and its casing K, within which it turns. As seen in this figure, an oil reservoir 79 is provided in the upper part of the column L with suitable leads to both the vertical and horizontal bearing surfaces, whereby these bearing surfaces and the ratchet member therebelow are adequately lubricated with but minimum attention. This oil reservoir is filled from above by removing the friction cap 79a, which of course is provided with the necessary vent.

As seen in Figure 1, the gear 70 is rigid with the stepped spindle 69, which turns in a boss in the cross member J. In this figure it will be seen that the gears 66 and 67 are rigid with the vertical shaft 80 which extends through the top plate 33, where as will be seen in Figure 6, the shaft 80 is provided with a miter gear 81 which turns a like gear 82 rigid with the shaft 83 journaled in the bearing bracket 84. The shaft 83 carries the previously described wheel 39 which is best seen in Figure 1, and which obviously turns once with each revolution of the main shaft.

From this comprehensive description it will be readily apparent that each revolution of the main shaft M produces a single movement of the various distinct parts, in some instances these movements are fractional, but the only multiple movement is the turning of the wrapper sizing rollers 12 and 13 which may make more than one revolution at each fractional rotation of the gear 10.

Each rotation of the main shaft M, performs the various functions required to completely wrap one fruit. The various steps required to effect the several required actions in the proper sequence, are obtained by the relative arrangement of the respective parts and these required relationships have been approximated by the illustrated position of the parts, wherein the machine is shown with a wrapper in position ready to receive a fruit. From this initial position, the various actions of one revolution of main shaft will be chronologically described.

In the operation of the machine the main shaft M turns downward to the rear, that is to say clockwise when viewed from the right side. During the first quarter turn of the main shaft, the wheel 39, last named in the description, turns clockwise and actuates the pinion 48, as will be obvious from Figure 1; the winding drum 50 turns with the pinion 48, both being rigid with the shaft 49; the cable 52 is thereby wound upon the drum 50, thereby moving the lateral carriage 53, whereby the basket 55 moves a single fruit from the conveyor 60 to the required position relative to pocket A, where the wrapper is already in position as indicated in Figure 14. This movement is interrupted by the set screw in the ratchet arm 46 impinging against the shaft 49 (Figures 1 and 6) whereupon the reel 58 returns the carriage to the initial position illustrated in Figure 1, the critical position of which is controlled by the projection 51 of the winding drum impinging against the bumper 85 shown in Figure 6, which preferably comprises a rawhide post 86 and an adjusting screw 87 as shown in Figure 14. As seen in Figure 6, this first quarter turn brings the cam 4 in contact with the lever 15, followed by like action of the cam 3, whereby the knife shears the wrapper at the moment the fruit is positioned on the wrapper. The second quarter turn actuates the lever 38, (Figure 1) whereby the push rod 35 introduces the fruit and its wrapper into the pocket A, obviously enveloping the fruit in the wrapper, like action of the push rod 34 simultaneously ejects a wrapped fruit from the pocket C; the parts being returned to their initial position by the action of the springs S, S.

This first half revolution of the main shaft, obviously places the arm 4a opposite from the position illustrated in Figure 6, whereby the ratchet pawl 9a is in position to turn the sizing mechanism, and likewise the arm 3a is then opposite to the position, illustrated in Figure 4, whereby the ratchet 63 is in position to actuate the conveyor, and also the arm 73 is opposite to the position illustrated in Figure 11, whereby the ratchet pawl contained in the drum 74 is in position to revolve the turnplate to position the pocket A at the location of the pocket B.

During the succeeding half turn, the conveyor 60 is moved one space, as the wrapper is simultaneously delivered to required position, while the turnplate revolves to required position with the consequent planetary rotation of the pockets A, B and C, accompanied by the closing of the tongs relative to pocket A, whereby the protruding portion of the wrapper is held between the tongs and effectively secured by twisting, and whereby the tongs of the pocket B will open when this pocket arrives at the position C. It will be clear that all parts now occupy the identical positions illustrated and it will be clear that during this last half turn, the parts mentioned in the preceding paragraph, are on their return stroke, and during the first half turn the parts mentioned in this paragraph are on their return stroke.

The conveyor 60, may be fed in any suitable manner and the machine may be driven from any available power source. Fruit packing being a rural industry, electric power is not always available; and obviously the various forms of power and different transmissions employed necessitate selective variations of the means for driving the machine.

For convenience of illustration the worm drive has been shown above the main shaft, however, in actual practice I prefer to dispose the worm below the main shaft. Figure 9 shows a vertical section of the machine assembled on legs 88, which are braced by a T-shaped member 89, which may serve as a support for the bearings E, E', as is illustrated by the dotted outline. Preferably, the bearings are placed in this indicated position and are preferably of the enclosed type, whereby the worm and gear are immersed in oil, and of course, suitable thrust bearings are provided for the worm, and preferably these bearings are of the roller type.

In this position of arrangement, the pulley 2 may be driven by a belt from the motor 90 mounted on the brace 91, or by a belt from a line shaft situated below, in which case the brace 91 may be replaced by a tie-rod similar to 92. Where the power source necessitates the pulley 2 being clear of the machine, an additional bearing 93, may be mounted on the L-shaped brace 94, and a longer shaft D used to extend the pulley as required. Where electric current is available, I prefer to use a variable speed motor mounted on the L-shaped brace 94; in which case the latter is lowered and adjustably mounted in the slots 95, and the driving worm is secured to the shaft of the motor, which motor may be provided with a switch and a suitable control, appropriately located on the left exterior of the machine, the holes 96 being provided for passage of the necessary conduits.

Where the adaptions do not require the illustrated cross braces, any or all of them may be replaced by tie rods, bolted in the appropriate holes otherwise employed for bolting the braces.

It will be readily apparent that in the single complete machine as described, provisions are made to meet the various demands encountered in actual practice and that therefore different models are entirely unnecessary.

The machine is practically free from vibrations and almost silent in operation, therefore it is not essentially necessary to anchor it to the floor with the conventional lag screws, which is slightly inconvenient where the floor is concrete. Furthermore, when not anchored, the machine can more conveniently be stored during the season of disuse, which is preferable when the fruit packing plant is not a weather proof structure.

As shown in Figure 1, the conveyor may comprise a single belt 100' having a number of equally spaced dividers thereon, said belt being trained around pulleys in the conventional manner and provided with suitable means to assure uniform movement as required. Preferably I employ a pair of parallel belts 100 spaced by means of transverse cleats 101, as shown in Figures 18 and 20. These cleats slide upon paired runners 102, each fashioned as an offset ledge in the conveyor trough which may be provided with low side walls 103, preferably outwardly flared, all as illustrated in Figure 20. The parallel belts 100, are spaced at sufficient distance to assure that the fruit will normally assume a central position on the conveyor and the side walls are sufficiently spaced to preclude contact with the moving fruit and the abrasion attendant thereto. The side walls 103 serve to prevent incidental escape of the fruit, but primarily they are intended to add sturdiness to said supporting runners, as the fruit will normally position itself in the void between the paired belts 100.

As shown in Figure 20, each cleat 101, may be secured to each of the parallel belts by means of a suitable bolt 104 which passes through the cleat 101 and the belt 100 and is then threaded into the dividing fin 105; or, a stepped stud may pass through a stepped bore in the dividing fin 105 then through the belt 100 and then threaded into the cleat 101; or, as is illustrated in Figure 21, each dividing fin 105' may be provided with a projecting base 105a, in which case each bolt 104' will pass through said base and one of said paired belts and be threaded into the cleat 101, in which case a post 106 may be secured to the cleat 101, or if the dividing fin 105' is sufficiently rigid, said post 106 may be omitted. From these descriptions it will be readily apparent that either the cleat 101, or the dividing fin 105 may with facility be removed or replaced without dismantling the conveyor.

The dividing fins 105 are preferably of firm rubber and are flared at the base sufficiently to assure normal position relative to the parallel belts. These dividing fins need not be higher than the radius of the largest fruit and are equally spaced to admit the largest fruit intended to be wrapped. Thus with properly spaced short dividing fins and low side walls, two small fruits will not ride in a single pocket as would otherwise occur with deep oversize pockets, which would of course interfere with proper operation of the machine.

The described conveyor belt is trained around two pulleys 107 and 108, each of which are provided with transverse grooves 109 on the contacting face. These grooves 109 are complementary to the aforementioned cleats 101 and are spaced similar thereto, thereby assuring positive traction and consequently, uniform movement of the conveyor. The pulley 107 turns upon the dead spindle 64 rigid with the frame plate F' and the pulley 108 is provided with appropriate bearings which may be attached to any suitable support, such as a bracket applied to a grader or to a feeder bin, or supported by a pedestal upon the floor. Preferably, the said pulleys are spaced by a frame work 110 which also supports the aforementioned runners and trough, suitable means being provided for adjusting the tension of the conveyor belts.

The conveyor may be of any length required to transport the fruit to the wrapping machine, or it may be used for the sole purpose of singly positioning the fruit to be received by the lateral carriage 53. In the latter case, both of the aforementioned pulleys may be pivoted on the frame plate F' and the trough secured to the frame plate F' by a suitable bracket.

Proper feeding of the conveyor is essential to constant operation of the machine and preferably the feed means should require a minimum of attention. As shown in Figure 18, my improved feed trough 111 is designed to produce an increasing transverse movement of the fruit as it nears the conveyor, whereby the fruit is disposed in a single column by the time it reaches the conveyor, which effectively precludes, blocking and clogging of the fruit, which would otherwise interfere with constant feeding of the conveyor. The feed trough 111 is transversely level at the entrance end 111' and is transversely inclined at the conveyor end 111'', as is best seen in Fig. 19. The trough as a whole is longitudinally inclined downwards towards the conveyor, sufficiently to produce the required movement of the fruit to the conveyor.

The feed trough is of a width equal to at least more than twice the diameter of the fruit, preferably thrice, and is adapted to be fitted into a complementary exit in any suitable hopper or bin of appropriate capacity, which latter member is of course inclined towards its exit opening.

The fruit enters the trough, say in three columns; and when a single fruit leaves the trough to enter the conveyor, as will normally occur from the longitudinal inclination of said trough, the fruit will feed down in the trough, and due to the increasing transverse inclination of the trough, the fruit will normally move towards the conveyor in the manner indicated by the directional arrows in Figure 18. The trough is preferably of sufficient length to assure two or three fruits in single column at all times. The feed trough 111 is illustrated with curved surfaces and it should be understood that plane surfaces may also be employed.

This improved arrangement is far more satisfactory and practical than a feed trough having converging side walls, which latter structure requires means or attention to repeatedly dislodge the fruit which frequently clogs at the point where the trough becomes of less width than two fruits. The improved structure is also preferable to various forms of mechanical feeding means.

As best seen in Figure 18, when the fruit enters the conveyor, it contacts a baffle 112, which is fashioned as an endless belt upon rollers comprising tubes 113, rotatable upon vertical shafts 114 which are rigid with a base 115, which latter member is horizontally adjustable upon a bracket 116 as will be readily apparent from Figures 18 and 20. Plainly, by adjusting the position of the baffle 112, the fruit may be stopped at the proper position relative to the conveyor and it will also be apparent that when the conveyor moves in the required manner, that the baffle belt 112 will move with the fruit, thereby avoiding frictional abrasion, and as previously described, the fruit will then assume a position between the paired belts 100 and will travel with the conveyor free of contact with the side walls 103 thereof.

When a single belt 100' is employed, the lateral movement of fruit may be accomplished by a simple slidable push plate 55, as shown in Figures 1 and 4; however I prefer to provide the lateral carriage with an improved basket, which will effectively lift the fruit free of adjacent structures during its lateral movement and thereby avoid the abrasion otherwise due to friction when the fruit is pushed along a contacting surface.

Figure 5 illustrates the preferred structure of my improved basket. As shown in this figure, a pair of prongs 117 are preferably inclined upwards away from the fruit; or, they may diverge towards the fruit; or, I may employ inclination and divergence combined. Preferably, said inclination is accomplished by parabolical curvature of the paired prongs, which are spaced to contact the opposite sides of the fruit below the horizontal diameter thereof, and the prongs are of sufficient width and appropriate shape to avoid sharp contact with the fruit.

As seen in Figure 2, the fruit is disposed in the void between the paired belts 100 of the conveyor and obviously no lateral movement of the fruit will occur until the fruit is lifted free of the conveyor. It will be readily understood that when the previously described prongs contact the opposite sides of the fruit, below the horizontal diameter thereof, that the advance movement of the prongs will primarily cause the fruit to ascend the inclination of said prongs until the fruit is free of the conveyor, as is illustrated in Figure 3, whereupon the fruit will then move with the prongs as the carriage 53 moves to required position.

The carriage with the fruit upon the prongs, moves at sufficient rate to preclude the fruit rolling from the prongs and it will be readily understood that when the advance movement of the carriage ceases and the reverse movement is immediately effected by the reel 58, that the fruit will of course leave the prongs as required. The fruit is effectively dropped upon the wrapper, unaccompanied by rolling, and inasmuch as the fruit does not contact the trough 27 during the lateral movement, rolling in the trough is likewise avoided. Obviously this improved arrangement reduces bruising and abrasion of the fruit to a minimum.

To accommodate various sizes of fruit, the prongs may be adjustably mounted as illustrated in Figure 5. In this figure each prong 117 is rigid with a block 118 slidable in the horizontal guide 119, which guide is vertically adjustable on the posts 120. The vertical adjustment may be accomplished by means of a suitable screw 121 and the horizontal spacing of the prongs 117 may be accomplished by means of the member 122 which is provided with oppositely threaded ends and a central disc 123 engaging in a complementary groove in the horizontal guide 119, whereby relative position of the prongs 117 and the horizontal guide is properly maintained in the various positions of adjustment.

In the case of smaller fruit which may not be centrally positioned with relation to the lateral carriage, it will be readily understood that the fruit will assume a central position upon contacting a single prong 117, and of course the prongs should be equally spaced from the center of the carriage to assure proper positioning of the fruit relative to the retaining pocket A and wrapper as required. The prongs may be rotatably adjustable on their longitudinal axis to afford appropriate contact with the contour of the fruit.

It should also be understood that where a single belt 100' is employed, that the described improved basket may be employed by providing a minor obstruction such as a bead or rib in the trough 27, whereby the fruit will be caused to rise on the prongs 117 in the previously described manner. The basket as illustrated in Figure 5 may be bolted to the lateral carriage 53 through the holes 124.

The wrapper feeding and cutting device herein disclosed, is made the subject of a divisional application Serial No. 58,921 filed Jan. 13, 1936 which matured into Patent No. 2,075,037; and the loading and unloading conveyor herein disclosed, is made the subject of a divisional application Serial No. 58,922 filed Jan. 13, 1936.

In the present invention, I claim:

1. A wrapping machine comprising a wrapper feeding device, a conveyor, a turnplate carrying rotatable article holders and wrapper gripping tongs, mechanism for operating all of said instrumentalities simultaneously during a fractional revolution of said turnplate, means adapted to move an individual article from said conveyor to position upon a wrapper disposed above one of said holders, means for cutting said wrapper from a continuous web, means for introducing said article and wrapper into said holder, means for simultaneously ejecting a wrapped article from another holder, mechanism for periodically and fractionally revolving said turnplate a predetermined amount, and mechanism for operating the four means aforesaid during the quiescent period of the fractional revolutions of said turnplate.

2. A wrapping machine comprising a conveyor having uniformly spaced dividers thereon, a trough feeding said conveyor, a baffle associated with said trough and conveyor, means for periodically actuating said conveyor an amount equal to the spacing of said dividers thereon, a turnplate having a number of uniformly spaced retaining pockets journaled therein, means for periodically revolving said turnplate fractionally an amount equal to the spacing of the pockets therein, means for superimposing a wrapper above one of said pockets at a predetermined point, a carriage operatable between said predetermined point and said conveyor, means for actuating said carriage as required, a push rod axially disposed relative to the pocket at said predetermined point, a second push rod axially disposed relative to a second pocket, means for actuating said push rods, a pair of coacting tongs superimposed above each of said pockets, means for opening and closing said tongs as required and means for rotating the aforementioned pockets relative to said turnplate as the latter revolves.

3. A wrapping machine comprising a rotatably mounted horizontal support, article holders vertically journaled in said support, means for periodically and fractionally revolving said support to successively move each of said holders to predetermined positions, means for feeding a wrapper to one of said predetermined positions, means for moving individual objects in a single column parallel to the path of said wrapper, means for successively moving said objects individually in a lateral path to required position upon the wrapper disposed above one of said holders, means for injecting the object and wrapper into the holder with the free margins of the wrapper protruding, means for holding the free margins of the wrapper in fixed relation to said support, means for rotating the holder as said support revolves, and means situated at another of said predetermined positions for ejecting the object after the wrapper has been secured by the resulting twist.

4. In a wrapping machine, a plurality of article holders revolvable about a fixed point and each rotatable on its own axis, an originating station and a terminating station, means for feeding a wrapper above the holder at said originating station, means for horizontally moving an individual object to required position relative to the wrapper and holder, an injector at said originating station, an ejector at said terminating station, separate operating means for said injector and ejector, individual means coacting with said separate operating means to simultaneously actuate said injector and ejector, means for revolving said article holders in a horizontal path between said originating station and said terminating station, means for rotating said holders in unison simultaneous with their revolution, means for holding the free margins of the wrapper antagonistic to rotation, said means for revolving and rotating said holders being actuated periodically, and said injector and ejector being actuated while said holders are stationary.

5. A wrapping machine comprising a turnplate having a number of open retaining pockets, a ratchet wheel operating said turnplate, said ratchet wheel having a number of teeth equal to the number of said pockets; a conveyor having a number of spaced dividers thereon, a ratchet actuating said conveyor, said ratchet being complementary to the spacing of said dividers; means for simultaneously operating each of said ratchets periodically; a carriage operatable transversely of said conveyor, means for actuating said carriage in the interval between the periodic action of the aforementioned ratchets; whereby the individual contents of said conveyor may be alternately positioned relative to each individual pocket of said turnplate at a predetermined position.

6. In a wrapping machine, a turnplate, a plurality of wrapping means carried by said turnplate, a conveyor, means for simultaneously operating said turnplate and conveyor in periodic fractional movements, a lateral carriage coordinated with said conveyor and wrapping means, means for actuating said lateral carriage in the interval between the periodic movements of said conveyor and turnplate, and means for operating said wrapping means during the periodic movement of said turnplate.

7. In a wrapping machine, a turnplate, a plurality of wrapping means carried by said turnplate, a conveyor, means for simultaneously operating said turnplate and conveyor in periodic fractional movements, wrapper feeding means, means for operating said wrapper feeding means and said wrapping means during the movement of said turnplate, a lateral carriage coordinated with said conveyor and wrapping means, wrapper cutting means, and means for actuating said lateral carriage and said wrapper cutting means during the interval between the periodic movements of said conveyor and turnplate.

8. A wrapping machine comprising a horizontal cross member having a casing perpendicular thereto, a column rotatable in said casing, a turnplate rigid with said column, wrapping means carried by said turnplate, said wrapping means operable by revolving said turnplate and means for periodically and fractionally revolving said column which is rigid with said turnplate, thereby operating said wrapping means as required.

9. A wrapping machine comprising an upright casing rigid upon a cross member, a stepped standard journaled in said casing, a turnplate rigid with said standard, an oil reservoir in the upper portion of said standard and opening through said turnplate, oil leads to the vertical and horizontal bearing surfaces of said standard, spaced article holders journaled in said turnplate, a gear rigid with each of said holders, a stationary internal gear concentric with said standard and engaging with the gears of said holders, a semicircular rib rigid with said stationary gear, wrapper gripping tongs for each of said holders, said tongs being pivoted in said turnplate and held in closed position by impingement of said semicircular rib and opened by spring tension when free of said semicircular rib; means for turning said standard to revolve said turnplate, rotate said article holders and alternately open and close said tongs.

10. A wrapping machine comprising a turnplate having a number of open cylindrical members rotatable therein; means for positioning a sized and cut wrapper above a selected cylindrical member; means for positioning an individual fruit upon said wrapper; means for pushing said fruit and wrapper into said cylindrical member; means within said cylindrical member for yieldably gripping said fruit and wrapper; a pair of coacting tongs positioned above each cylindrical member; means for actuating said tongs, whereby they grip the portion of said wrapper projecting above said fruit; means for simultaneously revolving said turnplate and rotating said cylindrical member together with the fruit and wrapper contained therein, whereby said wrapper is effectively twisted, thereby securing the same about the fruit as required.

11. A wrapping machine comprising a horizontal turnplate having a number of uniformly spaced article holders vertically journalled therein, each article holder comprising a hollow cylinder open at top and bottom and having article gripping means therein, means for periodically revolving said turnplate in fractional movements equal to the spacing of said holders, means for rotating all of said holders in unison and simultaneous with the revolution of said turnplate, and means carried by said turnplate for gathering the edges of a wrapper and holding the same in fixed relation to said turnplate.

12. A wrapping machine, comprising a horizontal turnplate having a number of equally spaced hollow cylindrical pockets vertically journaled therein; means for periodically revolving said turnplate in fractional movements equal to the spacing of said pockets, means operated by the revolution of said turnplate to cause all of said pockets to rotate in unison, said pockets being open at top and bottom and provided with article gripping means therein, means for simultaneously injecting an object downwardly into one of said pockets and ejecting an object downwardly through the open bottom of another of said pockets during the interval between the periodic fractional movements of said turnplate, and wrapper gripping means corelated with each of said pockets.

13. In a wrapping machine, the combination with an internal gear and a number of open gears forming a planetary system therewith, of a hollow cylindrical member rigid with each of said open gears, yieldable means within each cylindrical member to retain a globular body therein, wrapper gripping means corelated with each cylindrical member, and means for periodically actuating said planetary system, fractionally, a predetermined amount.

14. A wrapping machine comprising an internal gear and a number of open gears forming a planetary system therewith, an article holder rigid within each of said open gears, means for periodically actuating said planetary system fractionally a predetermined amount, and a pair of wrapper grippers disposed above each article holder and coacting therewith.

15. A wrapping machine comprising a rigid table having an internal gear rigid therewith, a semicircular rib concentric with said internal gear, a turnplate pivoted concentrically with said rib and internal gear, a number of rotatable pockets journaled in said turnplate, a gear rigid with each of said pockets, said gears engaging with the aforementioned internal gear and constituting a planetary system therewith, a pair of coacting tongs disposed above each pocket and pivoted in said turnplate, said tongs being held in open position by spring tension and closed by the leverage of a projection which impinges against the aforementioned semicircular rib, means for revolving said turnplate, whereby said pockets are rotated and whereby said tongs are closed by impingement of said semicircular rib, and whereby said tongs are opened by disengagement of said semicircular rib, in consequence of the revolving of said turnplate; and means for periodically receiving said turnplate, a fractional amount equal to the spacing of said pockets therein.

16. A wrapping machine comprising a number of spaced pockets rotatably mounted in a turnplate, a fixed semi-circular rib corelated with said turnplate, a pair of coacting tongs for each of said pockets, each pair of tongs being held in open position by spring tension and actuated by means of said semicircular rib contacting a lever on one of said tongs, means for revolving said turnplate and thereby actuating said tongs; means for rotating said pockets together with the fruit in the wrappers contained therein; whereby said tongs hold the projecting portions of the wrapper, thereby securing the same about the fruit by twisting.

17. A wrapping machine having a turnplate, a pair of wrapper gripping tongs geared together and pivoted in said turnplate, a stationary arcuate rib adjacent the periphery of said turnplate, a contact arm upon one of said tongs, a spring urging said arm against said rib, whereby said tongs will open and close in consequence of the revolution of said turnplate.

18. A wrapping machine comprising a turnplate having article holders rotatable therein and carrying a pair of coacting gripping tongs positioned above each of said holders, means whereby said pockets are rotated and said tongs alternately opened and closed in consequence of the revolution of said turnplate.

19. In a wrapping machine, the combination with a pair of wrapper gripping tongs, of an auxiliary arm carried by one of said tongs and extending transverse of the other tong when the pair are in closed position.

20. In a wrapping machine, the combination with a turnplate having hollow cylindrical members rotatable therein and yieldable means within said members for retaining an object therein; of means for simultaneously rotating said members and revolving said turnplate periodically and fractionally to predetermined positions; a push rod situated at one of said predetermined positions, a second push rod situated at another of said predetermined positions, means for actuating said push rods; and means for regulating the thrust of said push rods; whereby said push rods may be made to enter said cylindrical members, a predetermined amount.

21. In a wrapping machine, the combination with a periodically rotatable turnplate having a number of equally spaced retaining pockets rotatably mounted therein, of a collar journaled on a fixed vertical shaft, an overhead lever adapted to lift said collar, a plurality of push rods spaced complementary to said pockets to axially align therewith, secondary levers impinging on said collar and each engaging with a push rod, means for periodically rotating said turnplate an amount equal to the spacing of said pockets, and coordinated means for actuating said overhead lever during the interval between the periodic fractional movements of said turnplate; whereby said push rods are made to enter said pockets while said turnplate is stationary.

22. In a wrapping machine having a plurality of vertical push rods each axially disposed relative to a retaining pocket, the combination of a plurality of separate levers each adapted to actuate one of said rods, fulcrum support for each lever, a collar vertically movable upon a spindle and impinging the power end of each lever, and means for actuating said collar whereby the stroke end of each lever actuates its respective push rod and the several push rods are actuated simultaneously.

23. In a wrapping machine, a retaining pocket comprising an open cylindrical member, having a number of spaced elastic rubber diaphragms therein, each of said diaphragms having a central aperture concentric with said cylindrical member.

24. In a wrapping machine, the combination with a hollow cylindrical member, of a number of externally stepped rings and a number of spaced elastic diaphragms having an aperture therein, each of said diaphragms having an annular peripheral skirt engaged with one of said externally stepped rings, said rings being fixed to said retaining pocket, support for the lowermost ring which provides support for other rings and diaphragms superimposed thereabove and means for retaining said rings and diaphragms in assembled position within said retaining pocket.

25. In a wrapping machine, an article gripping means, comprising a perforate elastic cap member, an externally stepped ring adapted to fit within the rim of said cap and serve as a spacer for another cap member and ring superimposed in axial relation thereto.

26. In a wrapping machine, a wrapper supporting apron comprising a plate having a forward edge formed with reverse curves, the concave curve being intermediate the convex curves and said concave curve having a diameter exceeding the diameter of the largest fruit intended to be wrapped.

27. A wrapping machine comprising horizontally movable wrapping means, a wrapper supporting apron spaced above said wrapping means, said apron being notched out on the edge forward to the path of travel of said wrapping means, a trough leading to the notched out portion of said apron and spaced sufficiently apart from said apron to provide a passage therebetween for a wrapper and to confine the wrapper within said passage, whereby said apron will support the wrapper free of said movable wrapping means and said trough will support an object free of a wrapper on said apron.

28. In a wrapping machine, a wrapper supporting apron secured at its rear margin to frame work, a bolster overlying the side margin of said apron and secured thereto, the rear of said bolster secured to said framework, a trough to keep the fruit within bounds, said trough spaced above said apron by overlying said bolster.

29. In a wrapping machine comprising a turnplate carrying article holders and operatable in fractional movements to alternately dispose each of said holders to a predetermined position, ratchet means for operating said turnplate, a block pivoted to said ratchet means, a connecting bar forming a link between said block and its drive means, said block having a bore for the reception of said connecting bar, screw means on the end of said bar to regulate the extent of engagement of the bar within said block thereby to regulate the critical adjustment of said holders to predetermined position, and a setscrew for holding said bar and block in fixed relation.

30. In a wrapping machine, a turnplate, a stepped bore in said turnplate, an article holder journaled in said bore and held against gravity by an external flange engaging said step, a ring gear fitted around said holder and secured thereto in position to prevent upward displacement of said holder and by means of which the holder is rotated.

DON M. HUNTER.

CERTIFICATE OF CORRECTION.

Patent No. 2,090,257.  August 17, 1937.

DONALD M. HUNTER.

It is hereby certified that error appears in the printed specification of the above numbered patent requiring correction as follows: Page 9, second column, line 38, claim 15, for the word "receiving" read revolving; page 10, first column, lines 53 and 54, claim 24, for "fixed to" read fitted into; and that the said Letters Patent should be read with these corrections therein that the same may conform to the record of the case in the Patent Office.

Signed and sealed this 5th day of October, A. D. 1937.

Henry Van Arsdale (Seal)  Acting Commissioner of Patents.